(No Model.)

S. KATANI.
COMBINED LINER AND MEASURE.

No. 527,335. Patented Oct. 9, 1894.

WITNESSES:
C. Neveux
C. Sedgwick

INVENTOR
S. Katani
BY Munn & Co
ATTORNEYS.

UNITED STATES PATENT OFFICE.

SANNOSUKE KATANI, OF BELMONT, CALIFORNIA.

COMBINED LINER AND MEASURE.

SPECIFICATION forming part of Letters Patent No. 527,335, dated October 9, 1894.

Application filed May 27, 1893. Serial No. 475,747. (No model.)

*To all whom it may concern:*

Be it known that I, SANNOSUKE KATANI, of Belmont, in the county of San Mateo and State of California, have invented a new and Improved Combined Liner and Measure, of which the following is a full, clear, and exact description.

My invention relates to improvements in devices which are used for marking straight lines so that the article marked may be cut on the line or the line may be made for any purpose whatever, and also in measuring devices which are adapted to measure the length of a cord as it is unwound from its carrying drum.

The object of my invention is to produce a very simple device which may be conveniently carried about, by which a straight line may be easily marked, and by which also the length of the cord withdrawn is accurately indicated, so that to measure a certain distance one has only to straighten the cord and look upon the indicator.

To this end my invention consists of certain features of construction and combinations of parts, as will be hereinafter described and claimed.

Reference is to be had to the accompanying drawings, forming a part of this specification, in which similar figures of reference indicate corresponding parts in all the views.

Figure 1:
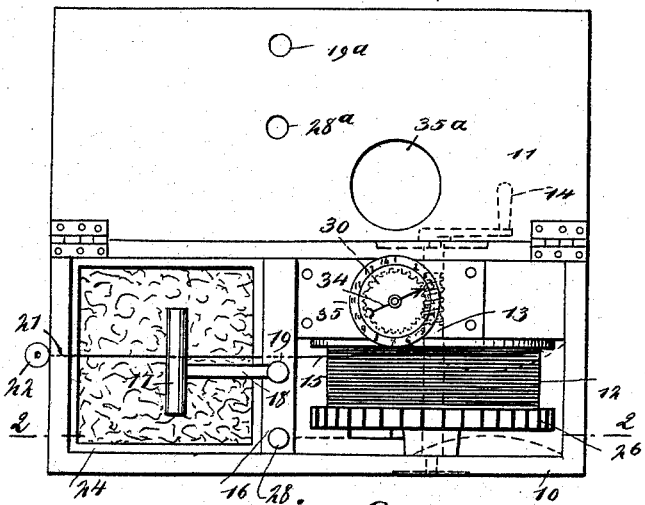
Figure 2:
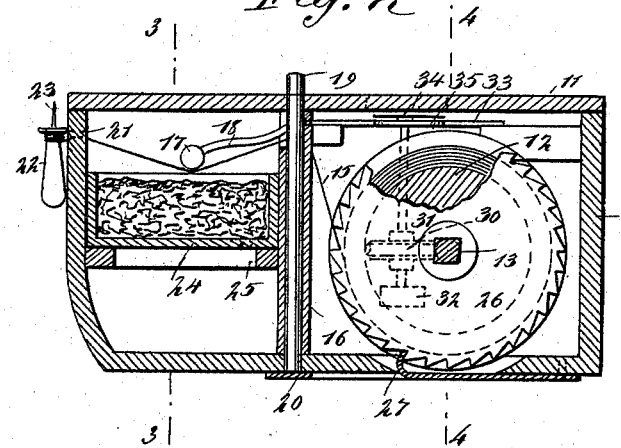
Figure 3:
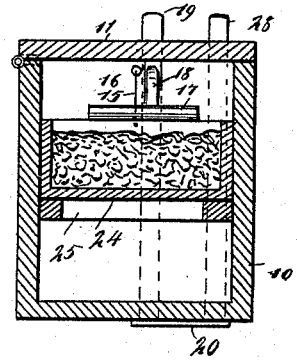
Figure 4:
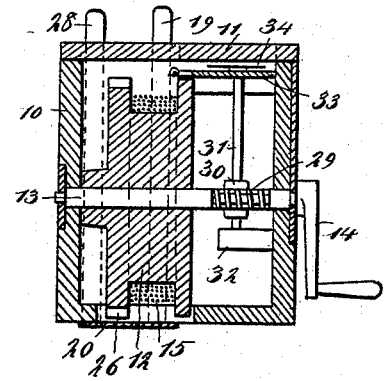
Figure 6:
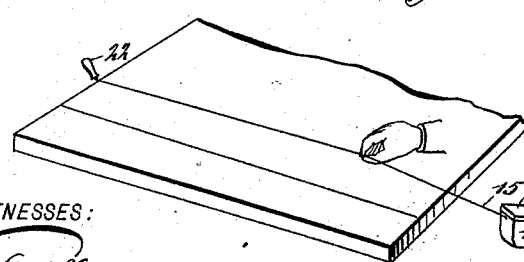
Figure 5:
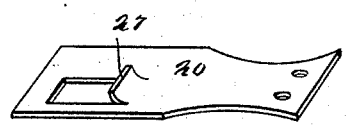

Figure 1 is a plan view of the device, embodying my invention, with the case open. Fig. 2 is a longitudinal section on the line 2—2 in Fig. 1, with the case closed. Fig. 3 is a cross section on the line 3—3 in Fig. 2. Fig. 4 is a cross section on the line 4—4 in Figs. 1 and 2. Fig. 5 is a perspective view of the spring plate and pawl which is attached to the case bottom; and Fig. 6 is a broken perspective view, illustrating the use of the device.

The device is provided with a suitable inclosing case 10 which has a lid 11 hinged to its top. Within the case is a spool or drum 12 which is carried by a shaft 13, and this shaft is journaled transversely in the case and has at one end a crank 14, this being arranged on the exterior of the case, as shown in Fig. 4, and by the crank the spool or drum may be turned so as to wind up the cord 15 thereon. This cord extends outward from the spool or drum through a transverse partition 16 in the case and beneath a guide 17 which is supported on an arm 18, and the latter is secured to a vertically movable post 19 which is adapted to project through a hole 19ª in the lid and which also projects through the bottom of the case, the post at its lower end resting on a spring plate 20 which normally raises the post and the chief function of which will be hereinafter described. After passing beneath the guide 17, the cord, which goes outward through an opening 21 in one end of the case, is secured to the handle 22 of a brad or awl 23 which, when the cord is wound up, is adapted to lie against one end of the case, as shown in Fig. 2. Beneath the guide 17 is an open topped ink well 24 in which ink, or any suitable coloring pigment is held, and in the well is a suitable absorbent which takes up the liquid and prevents it from spilling. The ink-well is supported on a bracket 25 within the case 10.

On one end of the spool 12 is a ratchet wheel 26, and this is engaged by a pawl 27 which is turned up on the spring plate 20 and, as this plate is fastened firmly to the bottom of the case and its tension is upward, it will be seen that the ratchet wheel and spool are normally locked. In the partition 16, parallel with the post 19, is another post 28 which extends through a hole 28ª in the lid 11 and which also rests upon the spring plate 20. It will be seen then that by depressing the post 19 the guide 17 will push the cord 15 into contact with the ink in the well and will, at the same time, depress the spring plate 20 and pawl 27 so as to release the ratchet wheel and permit the unwinding of the cord; but, if the cord is to be pulled out and not inked, the post 28 is depressed and this simply depresses the spring plate and pawl so as to release the ratchet wheel.

On the shaft 13 is a worm 29 which engages a worm wheel 30 on the vertical shaft 31 which turns in suitable supports 32 and 33, and carries at its upper end a pointer 34 adapted to turn opposite a circular dial 35 on which numbers are inscribed, and the lid 11 has a hole 35ª which registers with the dial and enables the dial to be seen when the lid is closed. The worm gear connecting the pointer 34 with the drum or spool 12 is timed so that, as the cord 15 is pulled out and the drum or spool unwound, the pointer will move the correct distance to indicate on the dial 35 the amount of line or cord which has been withdrawn.

The device is used as follows: If a line is to be made, the post 19 is depressed so as to push down the guide 17 and force the cord 15 into the ink-well 24. The depressing of the post also releases the pawl 27 and ratchet wheel 26 so that the cord may be freely withdrawn, and as it is withdrawn it turns the drum 12 and actuates the pointer 34 so as to show how much cord is withdrawn. The cord, as it is drawn out, is also thoroughly inked, and when the necessary amount has been pulled out, the awl 23 is made fast to the object on which the line is to be produced. The cord is stretched across the said object in the usual way, as shown in Fig. 6, and is then snapped upon the object in the same way that a chalk line is used, and a line is thus made upon the said object. For simple measuring, the post 28 is depressed so as to release the ratchet wheel and spool, as described, and the cord is then simply pulled out to the desired distance, which distance will be indicated in the manner specified. This arrangement enables vertical distances to be easily measured, as the handle 22 is of sufficient heft to drop and turn the registering or indicating mechanism, and consequently the post 28 may be pushed in and the handle 22 dropped from an elevation, and the distance from said elevation to the ground below is thus quickly and accurately measured.

Having thus described my invention, I claim as new and desire to secure by Letters Patent—

1. In a device of the kind described, the combination with a casing, a revoluble spool in the casing, and a cord wound upon the spool and extending out through the casing, of a ratchet on the spool, a spring pawl engaging the ratchet wheel, and a sliding rod resting upon the pawl, substantially as described.

2. In a device of the kind described, the combination with a casing, a revoluble spool in the casing, and a cord wound on the spool and having one end extending out through the casing, of an ink well in the casing beneath the cord, and a depressible guide for forcing the cord into the ink well, substantially as described.

3. In a device of the kind described, the combination with a casing, a spool mounted therein, and a cord wound on the spool and having one end extending out through the casing, of an ink well in the casing beneath the cord, and a sliding rod in the casing and provided with an arm carrying at its end a guide under which the cord passes, substantially as described.

4. In a device of the kind described, the combination with a casing a spool mounted in the casing, and a cord wound on the spool and having one end extending out through the casing, of a pawl and ratchet for locking the spool, an inking well in the casing beneath the cord, and a sliding rod having one end resting upon the pawl and provided with a guide for forcing the cord into the ink well, substantially as described.

SANNOSUKE KATANI.

Witnesses:
R. B. SPENCER,
GEO. A. BEZACOCK.